(12) United States Patent
Berneklev et al.

(10) Patent No.: US 8,677,954 B2
(45) Date of Patent: Mar. 25, 2014

(54) TWO-STROKE INTERNAL COMBUSTION ENGINE

(75) Inventors: Joel Berneklev, Göteborg (SE); Mikael Bergman, Bankeryd (SE)

(73) Assignee: Husqvarna AB, Huskvarna (SE)

( * ) Notice: Subject to any disclaimer, the term of this patent is extended or adjusted under 35 U.S.C. 154(b) by 191 days.

(21) Appl. No.: 13/260,668

(22) PCT Filed: Mar. 31, 2009

(86) PCT No.: PCT/SE2009/050340
§ 371 (c)(1),
(2), (4) Date: Sep. 27, 2011

(87) PCT Pub. No.: WO2010/114438
PCT Pub. Date: Oct. 7, 2010

(65) Prior Publication Data
US 2012/0024275 A1    Feb. 2, 2012

(51) Int. Cl.
*F02B 25/00*    (2006.01)
*F02B 33/04*    (2006.01)

(52) U.S. Cl.
USPC .................... 123/73 A; 123/73 AA; 123/73 C

(58) Field of Classification Search
USPC ........ 123/73 A, 73 AA, 73 AV, 73 AD, 73 C, 123/73 PP
See application file for complete search history.

(56) References Cited

U.S. PATENT DOCUMENTS

| | | |
|---|---|---|
| RE32,938 E | 6/1989 | Haman et al. |
| 5,269,243 A | 12/1993 | Mochizuki |
| 6,817,323 B2 | 11/2004 | Notaras et al. |
| 2006/0272599 A1 | 12/2006 | Johnson |

FOREIGN PATENT DOCUMENTS

| | | |
|---|---|---|
| EP | 0410355 | 1/1991 |
| EP | 1282763 | 1/2006 |
| JP | 2001323816 | 11/2001 |

OTHER PUBLICATIONS

International Search Report of PCT/SE2009/050340 dated Feb. 12, 2009.
Chapter II International Preliminary Report on Patentability of PCT/SE2009/050340 dated Jun. 30, 2011.

*Primary Examiner* — Noah Kamen
(74) *Attorney, Agent, or Firm* — Nelson Mullins Riley & Scarborough LLP

(57) ABSTRACT

A two stroke crank case scavenged two-stroke internal combustion engine, the engine including: —a cylinder (2) configured to reciprocatingly receive a piston (6) therein defining a combustion chamber (8), the combustion chamber comprising an ignition means (5) for igniting an air/fuel mixture and an exhaust port (40) for evacuating the exhaust fumes, —a crank case (3) including a crank shaft (18), —an indirect fuel supply system (4), such as a carburettor (12) or a low pressure fuel-injection system, for supplying fuel to the crank case (3) to be scavenged to the combustion chamber (8), —at least one transfer duct (20, 20') each extending from the crank case (3) to at least one corresponding transfer port (21, 21') for connecting to the combustion chamber (8), —additional air filling means (25, 24, 27, 23, 23', 22, 22',26, 26') for at least partly filling the transfer duct/s (20, 20') with additional air from the transfer port (21, 21') towards the crank case (3), —and a direct injection means (7) for injecting fuel directly into the combustion chamber (8).

16 Claims, 2 Drawing Sheets

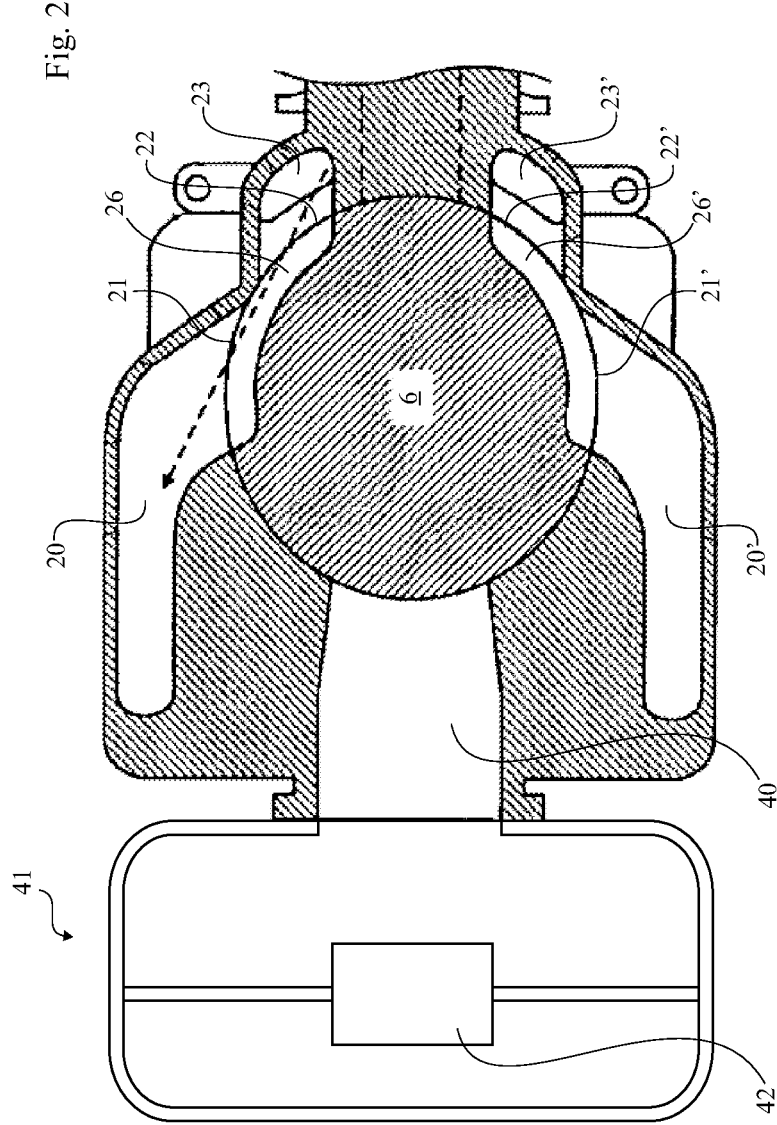

US 8,677,954 B2

TWO-STROKE INTERNAL COMBUSTION ENGINE

TECHNICAL FIELD

The subject invention refers to a two-stroke crankcase scavenged internal combustion engine, in which a piston ported or check valve controlled air passage is arranged between an air inlet and the upper part of a number of transfer ducts. Fresh air is added at the top of the transfer ducts and is intended to serve as a buffer against the air/fuel mixture below. Mainly this buffer is lost out into the exhaust port during the scavenging process. The fuel consumption and the exhaust emissions are thereby reduced. The engine is foremost intended for a handheld working tool.

BACKGROUND OF THE INVENTION

Combustion engines of the abovementioned kind are known and they reduce the fuel consumption and exhaust emissions compared to other two-stroke crankcase scavenged internal combustion engines. Two-stroke crankcase scavenged internal combustion engines can be built with low weight and size, are comparably easy to start when cold due to good atomization of the fuel since the fuel and air is mixed in the crank case. Further, they are also comparably cheap to produce and reliable at rough working conditions.

Two stroke engines using direct injection can reach even lower fuel consumption, since direct injection allows more precise control over fuel metering and injection timing. However, engines using direct injection have other problems compared to crank case scavenged engines. The primary disadvantages of direct injection engines are complexity, cost, size and weight. Direct injection systems are more expensive to build because their components must be more rugged—they handle fuel at significantly higher pressures than indirect injection systems and the injectors themselves must be able to withstand the heat and pressure of combustion inside the cylinder. Further direct injection engines also require a separate oil tank and components associated to lubricate the engine, while a crankcase scavenged engine can be lubricated using a fuel which is mixed with oil. For the above mentioned reasons size, weight and building costs of direct injection engines tend to increase, which of course is a disadvantage, especially for hand held working tools. Direct injection engine's can also be difficult to start when cold. This is particularly true when less volatile fuel types, such as alcohol based fuels which has had an increase in popularity since they can be produced from renewable resources, are used to power the engine. When the engine is cold, the fuel tends to atomize less, resulting in difficult starts. Further direct injection engines usually are battery assisted at start up to be able to inject the fuel at sufficient pressure and ignite. Once the engine is running, the environment into which fuel is introduced is both hotter and more turbulent for better fuel/air mixing and, consequently, better combustion.

OBJECTS OF THE INVENTION

One object of the invention is to provide a crank case scavenged engine using additional air and having further reduced emissions.

Another object is to provide an engine that can be easily started.

Another object is to provide an engine that does not require a battery at startup.

Another object is to minimize at least one of the problems or issues mentioned in the background of the invention.

SUMMARY OF THE INVENTION

The purpose of the subject invention is to solve at least one of the above mentioned objects by providing a two stroke crank case scavenged two-stroke internal combustion engine, the engine including: a cylinder configured to reciprocatingly receive a piston therein defining a combustion chamber, the combustion chamber comprising an ignition means for igniting an air/fuel mixture and an exhaust port for evacuating the exhaust fumes, a crank case including a crank shaft, an indirect fuel supply system, such as a such as a carburettor or a low pressure fuel-injection system, for supplying fuel to the crank case to be scavenged to the combustion chamber, at least one transfer duct each extending from the crank case to at least one corresponding transfer port for connecting to the combustion chamber, additional air filling means for at least partly filling the transfer duct/s with additional air from the transfer port towards the crank case, and a direct injection means for injecting fuel directly into the combustion chamber. Thereby the emissions and the fuel consumption of a crank case scavenged engine can be reduced. Further, the engine can easily be started and does not require a separate lubrication system.

Preferably, the air filling means include a piston ported valve comprising a piston recess that registers with an additional air port and a transfer port during piston positions at and/or near the top dead center of the piston to connect the transfer port/s with an intake system for additional air. Alternatively the air filling means include an intake for additional air to the upper part of the transfer duct/s, the intake having a check valve, such as e.g. a reed valve, and being connected to an intake system for additional air.

Preferably the indirect fuel supply system supplies fuel to the crankcase via a check valve or a piston controlled air/fuel inlet port connecting to the crankcase.

Preferably the direct injection means is a fuel injection system, preferably using a pressure above 2 bar. Thereby fuel can be directly injected to the combustion chamber, which in particular can reduce the fuel consumption and emissions.

Preferably, the indirect fuel supply system and the direct injection means are fluidly connected to a shared fuel tank. Thereby weight and building size can be kept down. Preferably the fuel in the fuel tank includes a small portion of oil to lubricate the crankcase via the indirect fuel supply system.

Alternatively, the engine includes an oil tank for oil injection to the crankcase, and possibly also to other lubrication spots. Thereby the fuel in the shared fuel tank does not need to include a small portion of oil for lubricating the crankcase.

Preferably, the direct injection means is directed to inject fuel at least in the vicinity of a spark generating portion of the ignition means. Thereby the fuel consumption and exhaust emissions can be reduced.

Preferably, the engine includes an electronic control unit arranged to control the indirect fuel supply system and/or the direct injection means. Thereby the fuel supply can be easily regulated. Preferably, the electronic control unit also controls the ignition timing of the ignition means. Thereby the ignition can be timed and adapted with the fuel supply.

Preferably, the electronic control unit is arranged to control the engine in such a manner that during idle throttle, when the engine is reasonably warm, the indirect fuel supply system is shut off or kept at a low level while the direct injection means injects fuel at least in the vicinity of a spark generating portion of the ignition mean, and arranged to control the ignition mean to generate a spark at each revolution that fuel is injected. Thereby the fuel consumption and emissions can be lowered during idle throttle since substantially fuel is only supplied to the combustion chamber at those revolutions combustion occurs which reduces the amount of unburnt fuel in the exhaust fumes.

Preferably, the electronic control unit is arranged to control the engine in such manner that during start-up of the engine the direct injection means is shut-off so that fuel is only supplied from the indirect fuel supply system. Thereby the engine can be easily started even during cold conditions due to good atomization of the fuel since the fuel and air is mixed in the crankcase.

Preferably a muffler is mounted directly, i.e. without a connecting duct, to the exhaust port of the engine cylinder.

Preferably the muffler includes at least one catalytic element, i.e. is a catalytic muffler. Previously in many two-stroke engine powered tools the exhaust fumes have contained so high amounts of unburnt fuel that a catalyst muffler could become too hot to be used in practise. Another solution would be to use a catalyst muffler with a reduced conversion rate, i.e. with a reduced cleaning rate. Since the engine of the invention reduces the amount of unburnt fuel in the exhaust fumes it makes it easier to use a catalytic muffler, thereby enabling reducing the emissions of unburnt fuel even further.

Preferably a centrifugal clutch is arranged on a crank shaft of the engine and the clutch is arranged to drive a work tool, e.g. a chain, saw blade or similar on a hand held power tool.

Preferably the engine is used in a hand held power tool.

The invention also concerns a method for operating the crank case scavenged two-stroke internal combustion described above, the method including the steps of:
  providing fuel and air to the crank case,
  providing additional air to the transfer duct(s),
  scavenging with additional air to force exhaust fumes out through the exhaust port,
  scavenging an air and fuel mixture from the crank case to the combustion chamber,
  Injecting fuel directly into the combustion chamber using a direct injection means,
  Igniting the air and fuel mixture of the combustion chamber.

Further the invention also concerns a method for engine start and warm up that is the same as above, but no fuel is injected directly into the combustion chamber. Possibly a short direct fuel injection, i.e. during only a fraction of the start time, could be used during engine start.

BRIEF DESCRIPTION OF THE DRAWINGS

FIG. 2 is a cross-sectional view taken along the sectional line A-A indicated in FIG. 1 showing a schematic of several components of the instant two-stroke internal combustion engine, including representations of the piston, cylinder and associated fluid flow passages embodied therein. Also a possible catalytic muffler is schematically shown.

DETAILED DESCRIPTION OF THE INVENTION

Figure 1:
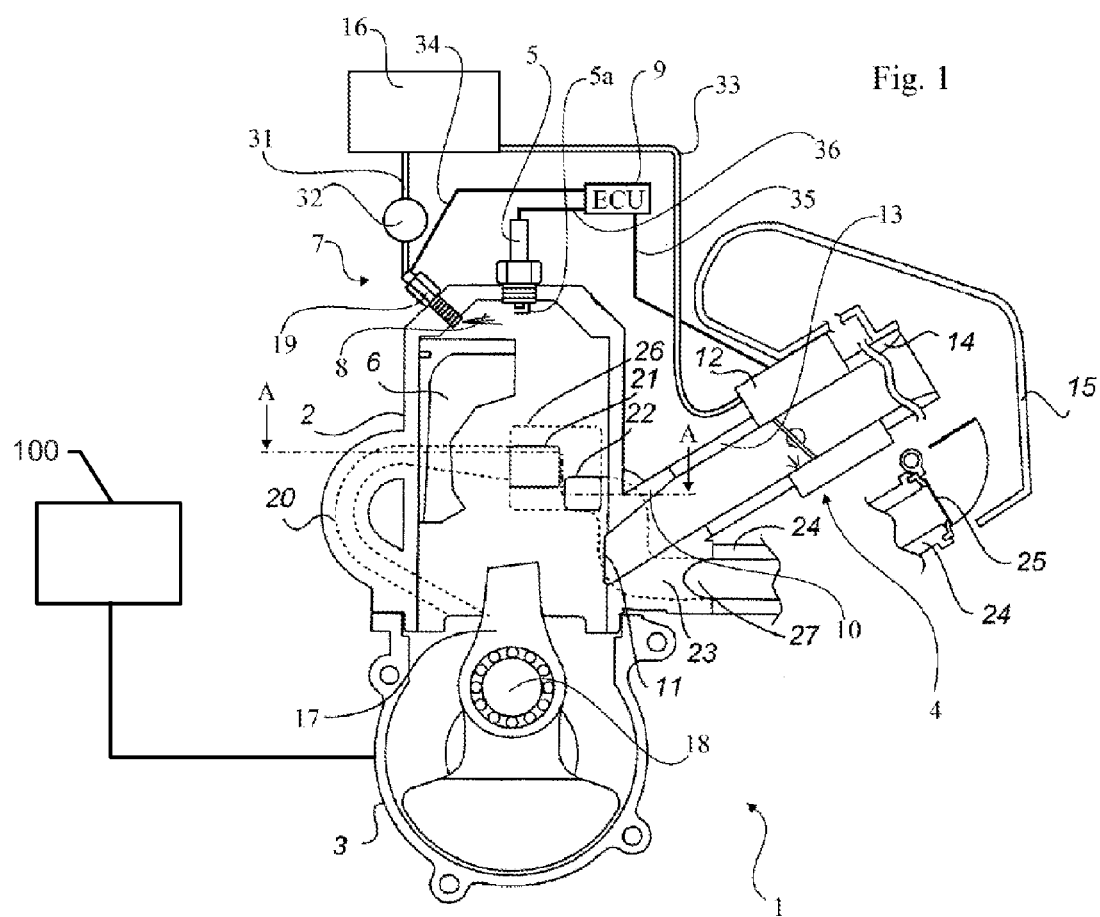
FIG. 1 is an essentially bisected elevational cut-away view of a two-stroke internal combustion engine configured according to the teachings of the present inventions; certain components are shown in partial cut-away for clarity.

The invention will be described in greater detail and by way of various embodiments thereof with reference to the accompanying drawing figures. For parts that are symmetrically located on the engine, the part on the one side has been given a numeric designation while the part on the opposite side has been given the same numeric designation, but with a prime (') symbol appended thereto. In general, when referring to the drawings, the corresponding parts designated with a prime symbol are located above the plane of the paper and are therefore not expressly shown in some views.

In the context of the application when using the term "fuel" it should be understood that it also could mean a mixture of fuel and oil, depending on if the fuel tank is adapted to contain a fuel and oil mixture that also lubricates the engine, or if separate fuel and oil tanks are used and where the engine is e.g. lubricated by oil injection into the crank case.

In FIG. 1, an internal combustion engine 1 is shown and FIG. 2 is a cross-sectional view taken along the sectional line A-A in FIG. 1. The engine 1 has a cylinder 2 configured to reciprocatingly receive a piston 6 therein defining a combustion chamber 8, and a crank case 3 including a crank shaft 18 controlling the movement of the piston 6 via a connecting rod 17. In the figure the piston 6 and connecting rod 17 are partly cut away, for the purpose of showing other parts of the engine more clearly.

The engine 1 is of a two-stroke crankcase scavenged type using additional air. The engine 1 includes an indirect fuel supply system 4 supplying air and fuel to the crank case 3 to be scavenged to the combustion chamber 8. The indirect fuel supply system 4 can e.g. be of carburettor type as shown in the FIG. 1 or a low pressure fuel injection system. The engine 1 also includes a direct fuel supply system 7, referred to as a direct injection means 7, directly injecting fuel into the combustion chamber 8. Thus the combustion chamber 8 can be supplied with fuel indirectly by scavenging an air and fuel mixture from the crank case 3 and directly by injecting fuel into the combustion chamber 8. To ignite the air/fuel mixture during the operation of the engine 1 a spark plug 5 extends through a first bore in the cylinder wall into the combustion chamber 8. The combustion chamber 8 also has an exhaust port 40 (shown in FIG. 2) according to a conventional design. In application, such an exhaust port 40 is typically connected to a muffler 41 (shown in FIG. 2) for post treatment, particularly for noise minimization. The shown muffler 41 is mounted directly to the exhaust port 40. The muffler 41 can be a catalytic muffler, having at least one catalytic element 42 and reducing the emissions of unburnt fuel even further. The element 42 is of conventional design and preferably made of a great length of thin metal wire coated with catalytic material and prepared to form a flow-through grid. Alternatively thin layers of coated sheet metal, corrugated and flat, could be wound to form an element. It is also possible to use a number of coated baffles inside the muffler to perform the catalytic function.

The carburettor 12 in FIG. 1 is a conventional membrane carburettor but also other types of carburettors can of course be used. Fuel is supplied to the carburettor 12 through an indirect fuel supply line 33 that draws fuel from a fuel tank 16. The carburetor 12 has an air inlet 14, which is arranged to take air from an air filter 15. At its opposite end the carburettor 12 connects, via an intermediate connection 13, to an air/fuel mixture inlet duct 10 that terminates at an interior wall of the cylinder 2 in a air/fuel inlet port 11 to the crank case 3. The intermediate connection 13 enables a relatively free location of the carburettor 12. The air/fuel inlet port 11 shown in the figure is piston controlled, i.e. it opens up to the crankcase 3 at certain piston positions. Alternatively, the opening/closing of the air/fuel inlet port 11 could be controlled by a check valve, e.g. a reed valve. The carburetor 12 supplies an air/fuel mixture to the crankcase 3 via the inlet duct 10 in a manner known per se and it will therefore not be described in detail.

Preferably the carburettor 12 or indirect fuel supply line 33 is equipped with an electronically controlled valve (not shown) so that the amount of fuel delivered is not only affected by the varying pressures from opening and closing the air/fuel inlet port 11, but can be electronically controlled by opening and closing the valve.

From the crankcase 3, air and fuel mixture is carried through one or several transfer ducts 20. 20' up to the combustion chamber 8, when the piston is in a low position. The transfer ducts 20, 20' each have at least one transfer port 21, 21' that debouches into the cylinder 2. The transfer ducts 20, 20' connect the transfer ports 21, 21' to the crankcase 3. The transfer ducts 20, 20' can be arranged radially outwards from the cylinder in the conventional way, or, as shown in the figure, be arranged tangentially from the transfer ports 21, 21'. The transfer ports 21, 21' connects to the combustion chamber at certain piston positions, i.e. the movement of the piston 6 controls the opening and closing of the transfer ports 21, 21' to the combustion chamber 8. Alternatively, the opening/closing of the transfer ports 21, 21' could be controlled by check valves, e.g. reed valves. Close to each transfer port 21, 21', and located somewhat further down along the cylinder wall, a corresponding additional air port 22, 22' for fresh air is arranged. An additional air inlet 24 that is equipped with a restriction valve 25 has an additional air duct 27 that splits into multiple branch extensions 23, 23', exemplarily two, that terminate at the additional air ports 22, 22'. The additional air inlet 24 takes air via the air filter 15.

During running of the engine 1, which will not be described in closer detail here, the additional air ports 22, 22' will connect to the transfer ports 21, 21' via a recess in the piston at certain piston positions, i.e. the connection is piston controlled. This recess is illustrated as a dashed square 26, 26' in the figure. Thereby fresh air can flow through the air inlet 24 into the transfer ducts 20, 20'. Alternatively the connection between the additional air ports 22, 22' and the transfer ports 21, 21' could be controlled by check valves, e.g. reed valves. The transfer ducts 20, 20' will be partly or fully filled with fresh additional air in a direction from the transfer ports 21, 21' towards the crankcase 3. As the piston 6 continues to move the connection between the additional air ports 22, 22' and the transfer ports 21, 21' closes, and thereafter the transfer ports 21, 21' will open up to the combustion chamber 8 first feeding additional air to evacuate the exhaust fumes through the exhaust port 40 (see FIG. 2) followed by the air/fuel mixture from the crank case 3.

The direct fuel supply system 7 includes an injection nozzle 19 that is mounted in second bore in the cylinder wall that extends into the combustion chamber 8, a direct fuel supply line 31 and a direct fuel pump 32. The direct fuel pump 32 provides a pumping pressure in the direct fuel supply line 31 so that fuel from the fuel tank 16 can be injected into the combustion chamber 8 via the injection nozzle 19. Also two pumps 32 could be used that could be of different type and for different pressure levels, e.g. a first low pressure pump supplying a second higher pressure pump. The pump/s 32 may e.g. be a membrane pump that utilizes pressure variations in the crank case (i.e. in a similar manner as a membrane carburettor), a reciprocating pump or a gear pump driven by the crankshaft 18. They could also be electrically driven.

Preferably, the injection nozzle 19 includes an electronically controlled valve (not shown) and the pump/s 32 provides a constant pressure during the engine cycle, so that the injection of fuel into the combustion chamber 8 can be controlled by an electronic control unit (ECU) 9 by opening and closing the valve. The electronic controlled valve could e.g. be a piezoelectric valve or a solenoid valve.

However the nozzle 19 may alternatively have a mechanically controlled valve that for instance opens up to the combustion chamber 8 when a fuel pressure threshold is exceeded. This can be done by having a varying pump pressure during, so that the mechanical valve opens up at desired positions of the piston 6 thereby injecting fuel into the combustion chamber 8. The pump pressure can be varied actively by having the ECU 9 controlling the pump/s 32 or by having a passive system e.g. only governed by the movement of the crankshaft 18 or pressure variations in the crank case 3.

Regardless, to inject fuel into the combustion chamber 8 the injection pressure should be above 2 bar, preferably above 5 bar even more preferred above 10 bar. High fuel pressures provide two advantages, first more fuel can be delivered during a short time period—preferably during the period when the exhaust port is closed. Second the fuel can be delivered in smaller drops, which are easier to ignite. Even fuel pressures above 1000 bar are possible and could bring advantages. On the other hand cost, energy need and strain on the components all increase with increasing fuel pressure. Because a big portion of the total fuel amount is supplied by the indirect fuel supply system 4, a lower pressure could be used by this direct fuel supply system 7 compared to a direct fuel supply system that provides all fuel by itself. Therefore the pressure is preferably below 600 bar, more preferably below 300 bar, still more preferred below 200 bar, and most preferred below 100 bar. It is further preferred that the injection nozzle 19 is directed to inject fuel towards the spark electrodes 5a or even more preferably in the vicinity thereof.

The indirect fuel supply system 4 and the direct fuel supply system 7 preferably draw fuel from the same fuel tank 16, i.e. they share the fuel tank 16. Preferably, the fuel tank 16 should contain a mixture of fuel and oil so that the engine is lubricated by the indirect fuel supply system 4. In this case the fuel injected into the combustion chamber 8 from the direct injection system 7 will also contain a small portion of oil. Alternatively, the fuel tank 16 contains a fuel without any oil inclusions. In this case it is preferred to have an additional oil tank 100 for lubrication of the crankcase 3, for instance by injecting oil into the crank case. Alternatively two fuel tanks 16 are used one containing a fuel and oil mixture for the indirect fuel supply system 4, and the other one containing fuel without oil inclusions for the direct fuel supply system 7.

The engine further includes at least one electronic control unit 9. The ECU 9 is preferably arranged to control the indirect fuel supply system 4 as schematically indicated by the indirect fuel control connection 35 and the direct injection means 7 as schematically indicated by the direct fuel control connection 34. Preferably it also controls the ignition through the spark plug 5 as schematically indicated by the ignition control connection 36. The ECU could be part of an ignition module or be a separate part and be located in many different positions.

During idle throttle of the engine the ECU 9 is preferably arranged to control the engine in such manner that the indirect fuel supply system 4 is shut off or kept at a low level while the direct injection means 7 injects fuel into the combustion chamber 8, preferably towards the spark electrodes 5a or even more preferably in the vicinity thereof. The ECU 9 further control the spark plug 5 to generate a spark only at those revolutions when fuel is supplied to the combustion chamber 8 by the direct injection means 7.

Furthermore according to one aspect, the ECU 9 is arranged to control the engine 1 in such manner that during start-up the direct injection means 7 are shut-off so that fuel is only supplied from the indirect fuel supply system 4. I.e. the engine is started as a normal crank case scavenged engine which is easy to start due to good atomisation of the fuel. Alternatively during a fraction of the engine start time fuel could be supplied by the direct injection means, as a priming function. After a predetermined condition(s) is fulfilled, such as a predetermined time period from start, a predetermined engine temperature or that the engine speed has stabilised, the engine can run according to the idle throttle method described previously above. In a very special alternative, preferably in connection with high fuel pressures, the direct injection means could possibly be used alone during start-up.

In alternative embodiments it would be possible to regulate the fuel supply to the combustion chamber 8 by having the ECU 9 either actively controlling the fuel supply through the direct injection means 7 or the indirect fuel supply system 4, while having the other passively supplying fuel to the combustion chamber 8, i.e. without intervention of the ECU 9. Furthermore, the ignition of the spark plug 5 may also be controlled by an own control unit separated from the ECU 9 controlling the fuel supply. Alternatively the ECU 9 controls the ignition of the spark plug 5 and the direct injection means 7, while the fuel supply via the indirect fuel supply system 4 is controlled by another control unit or being fed at a constant rate.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes at least one of the stated objectives.

The invention claimed is:

1. A crank case scavenged two-stroke internal combustion engine, the engine including:
    a cylinder configured to reciprocatingly receive a piston therein defining a combustion chamber, the combustion chamber comprising an ignition means for igniting an air/fuel mixture and an exhaust port for evacuating the exhaust fumes,
    a crank case including a crank shaft,
    an indirect fuel supply system for supplying fuel to the crank case to be scavenged to the combustion chamber,
    at least one transfer duct each extending from the crank case to at least one corresponding transfer port for connecting to the combustion chamber,
    additional air filling means for at least partly filling the at least one transfer duct with additional air from the transfer port towards the crank case,
    and a direct injection means for injecting fuel directly into the combustion chamber.

2. An engine according to claim 1 wherein the additional air filling means include a piston ported valve comprising a piston recess that registers with an additional air port and a transfer port during piston positions at and/or near the top dead center of the piston to connect the transfer port with an intake system for additional air.

3. An engine according to claim 1 wherein the direct injection means is a fuel injection system using a pressure above 2 bar.

4. An engine according to claim 1 wherein the indirect fuel supply system and the direct injection means are fluidly connected to a shared fuel tank.

5. An engine according to claim 4 wherein the engine further includes an oil tank operably coupled to the crankcase to inject oil into the crankcase.

6. An engine according to claim 1 wherein the direct injection means is directed to inject fuel at least in the vicinity of a spark generating portion of the ignition means.

7. An engine according to claim 1 wherein the engine includes an electronic control unit arranged to control the indirect fuel supply system and the direct injection means.

8. An engine according to claim 7 wherein the electronic control unit controls the ignition timing of the ignition means.

9. An engine according to claim 8 wherein the electronic control unit is arranged to control the engine in such manner that during idle throttle the indirect fuel supply system is shut off or kept at a low level while the direct injection means injects fuel at least in the vicinity of a spark generating portion of the ignition mean, and arranged to control the ignition means to generate a spark at each revolution that fuel is injected.

10. An engine according to claim 7 wherein the electronic control unit is arranged to control the engine in such manner that during start-up of the engine the direct injection means is shut-off so that fuel is only supplied from the indirect fuel supply system.

11. An engine according to claim 1 wherein a muffler is mounted directly, without a connecting duct, to the exhaust port of the engine cylinder.

12. An engine according to claim 11 wherein the muffler includes at least one catalytic element.

13. A hand held power tool comprising a crank case scavenged two-stroke internal combustion engine, the engine including:
    a cylinder configured to reciprocatingly receive a piston therein defining a combustion chamber, the combustion chamber comprising an ignition means for igniting an air/fuel mixture and an exhaust port for evacuating the exhaust fumes,
    a crank case including a crank shaft,
    an indirect fuel supply system for supplying fuel to the crank case to be scavenged to the combustion chamber,
    at least one transfer duct each extending from the crank case to at least one corresponding transfer port for connecting to the combustion chamber,
    additional air filling means for at least partly filling the transfer duct with additional air from the transfer port towards the crank case,
    and a direct injection means for injecting fuel directly into the combustion chamber.

14. A method for operating a crank case scavenged two-stroke internal combustion engine comprising:
    a cylinder configured to reciprocatingly receive a piston therein defining a combustion chamber, the combustion chamber comprising an ignition means for igniting an air/fuel mixture and an exhaust port for evacuating the exhaust fumes,
    a crank case including a crank shaft,
    an indirect fuel supply system for supplying fuel to the crank case to be scavenged to the combustion chamber,
    at least one transfer duct each extending from the crank case to at least one corresponding transfer port for connecting to the combustion chamber,
    additional air filling means for at least partly filling the transfer duct/s with additional air from the transfer port towards the crank case,
    and a direct injection means for injecting fuel directly into the combustion chamber, the method including:
    providing fuel and air to the crank case,
    providing additional air to the at least one transfer duct,
    scavenging with additional air to force exhaust fumes out through the exhaust port,
    scavenging an air and fuel mixture from the crank case to the combustion chamber, injecting fuel directly into the combustion chamber using a direct injection means, igniting the air and fuel mixture of the combustion chamber.

15. A method for operating the crank case scavenged two-stroke internal combustion engine of claim 14 during engine start and warm-up, the method including:

providing fuel and air to the crank case, providing additional air to the at least one transfer duct, scavenging with additional air to force exhaust fumes out through the exhaust port, scavenging an air and fuel mixture from the crank case to the combustion chamber, igniting the air and fuel mixture of the combustion chamber.

16. A method for operating the crank case scavenged two-stroke internal combustion engine of claim 15, the method further including:

injecting fuel directly into the combustion chamber using the direct injections means for a period of time that is a fraction of a start time of the engine.

\* \* \* \* \*